United States Patent
Yang et al.

(10) Patent No.: US 8,477,655 B2
(45) Date of Patent: Jul. 2, 2013

(54) METHOD, DEVICE, AND SYSTEM FOR ESTABLISHING LABEL SWITCHING PATH IN FAST REROUTING SWITCHING

(75) Inventors: Xing Yang, Shenzhen (CN); Feng Ke, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 438 days.

(21) Appl. No.: 12/784,089

(22) Filed: May 20, 2010

(65) Prior Publication Data
US 2010/0296412 A1  Nov. 25, 2010

(30) Foreign Application Priority Data
May 20, 2009 (CN) .......................... 2009 1 0143208

(51) Int. Cl.
H04L 12/28 (2006.01)

(52) U.S. Cl.
USPC .......................................... 370/254; 370/258

(58) Field of Classification Search
USPC .................. 370/217, 227, 228, 254
See application file for complete search history.

(56) References Cited

U.S. PATENT DOCUMENTS

| 7,406,032 | B2 * | 7/2008 | Li et al. ......................... | 370/217 |
| 7,796,504 | B1 * | 9/2010 | Owens et al. ................. | 370/227 |
| 8,218,432 | B2 | 7/2012 | Le Roux et al. | |
| 2003/0210705 | A1 | 11/2003 | Seddigh et al. | |
| 2006/0159009 | A1 | 7/2006 | Kim et al. | |
| 2007/0183317 | A1 | 8/2007 | Vasseur et al. | |
| 2008/0170493 | A1 | 7/2008 | Vasseur | |
| 2010/0008222 | A1* | 1/2010 | Le Roux et al. .............. | 370/228 |

FOREIGN PATENT DOCUMENTS

| CN | 1599350 A | 3/2005 |
| CN | 101159681 A | 4/2008 |
| EP | 1475927 A2 | 11/2004 |
| FR | 2906430 A1 | 3/2008 |

OTHER PUBLICATIONS

European Office Action, European Application No. 10 163 405.3-2416, Applicant: Huawei Technologies Co., Ltd., Dated Oct. 12, 2011, 6 pages.

(Continued)

*Primary Examiner* — Dang Ton
*Assistant Examiner* — Lionel Preval
(74) *Attorney, Agent, or Firm* — Slater & Matsil, L.L.P.

(57) ABSTRACT

A method, device, and system for establishing a label switching path (LSP) in fast rerouting (FRR) switching are provided, which can ensure that an ingress point and a merge point (MP) refresh path information in time. The method includes that first messages are respectively sent to an ingress point and an MP on an LSP, where the first messages carry information of holding a path refreshing state, so that the ingress point and MP determine the time of holding the path refreshing state according to the information of holding the path refreshing state; and second messages are respectively sent to the ingress point and the MP in the time of holding the path refreshing state, where the second messages carry information of refreshing a path state, so that the ingress point and MP establish the LSP according to the information of refreshing the path state.

11 Claims, 7 Drawing Sheets

OTHER PUBLICATIONS

Sharma, V., et al., "Framework for Multi-Protocol Label Switching (MPLS)-based Recovery; rfc3469.txt," IETF Standard, XP 015009252, Feb. 2003, 40 pages, The Internet Society.

Pan, P., et al., "Fast reroute Extensions to RSVP-TE for LSP Tunnels; rfc4090.txt," IETF Standard, XP 015041909, May 2005, 38 pages, The Internet Society.

Extended European Search Report, European Application No. 10163405.3-2416, Dated: Jul. 22, 2010, 7 pages.

European Office Action, European Application No. 10 163 405.3-2416, Applicant: Huawei Technologies Co., Ltd., Dated: Mar. 28, 2011, 5 pages.

Pan et al., "Fast Reroute Extension to RSVP-TE for LSP Tunnels," IETF Standard, Internet Engineering Task Force, May 2005, 38 pages.

Weilian et al., "Mechanism of Multiple Adjacent Nodes RSVP Graceful Restart Simultaneously," ZTE Corporation, Nov. 20, 2005, 12 pages.

Sharma et al., "Framework for Multi-Protocol Label Switching (MPLS)-based Recovery," IETF Standard, Internet Engineering Task Force, Feb. 2003, 38 pages.

Extended European Search Report regarding European Patent Application No. 12162738.4, dated May 3, 2012, 9 pages.

* cited by examiner

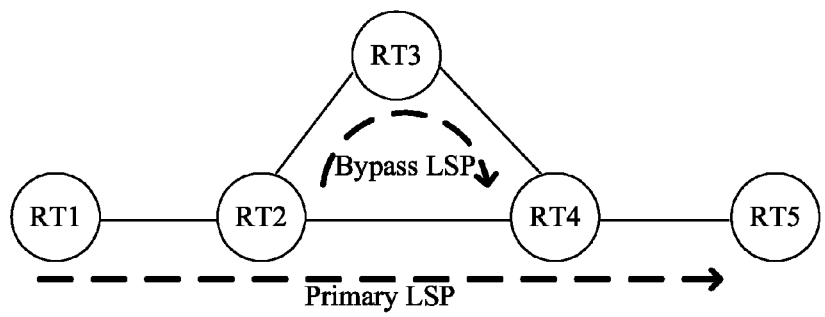

FIG. 1

```
┌─────────────────────────────────────────────────────────┐
│ Respectively send first messages to an ingress point   │
│ and an MP on an LSP, in which the first messages carry │
│ information of holding a path refreshing state, such   │    S201
│ that the ingress point and the MP determine a time of  │
│ holding the path refreshing state according to the     │
│ information of holding the path refreshing state in    │
│ the first messages.                                    │
└─────────────────────────────────────────────────────────┘
                            │
                            ▼
┌─────────────────────────────────────────────────────────┐
│ Respectively send second messages to the ingress point │
│ and the MP in the time of holding the path refreshing  │
│ state, in which the second messages carry information  │    S202
│ of refreshing a path state, such that the ingress      │
│ point and the MP establish the LSP according to the    │
│ information of refreshing the path state in the second │
│ messages                                               │
└─────────────────────────────────────────────────────────┘
```

FIG. 2

METHOD, DEVICE, AND SYSTEM FOR ESTABLISHING LABEL SWITCHING PATH IN FAST REROUTING SWITCHING

This application claims priority to Chinese Patent Application 200910143208.8, which was filed May 20, 2009 and is incorporated herein by reference.

TECHNICAL FIELD

The present invention relates to the field of communications, and more particularly to a method, device, and system for establishing a label switching path (LSP) in fast rerouting (FRR) switching.

BACKGROUND

In a multi-protocol label switching (MPLS) network, when an ingress point sends packets to a destination point, the ingress point classifies the received packets into a forwarding equivalence class according to types of the packets, and sends the received packets to the destination point through a traffic engineering tunnel (TE Tunnel) corresponding to the forwarding equivalence class, where a path of transmitting the packets through the TE Tunnel is called an LSP. For example, referring to FIG. 1, an ingress point RT1 transmits packets to a destination point RT5 through RT1-RT2-RT4-RT5. In order to ensure quality of service (QoS) of the MPLS network, an FRR technology is introduced, which protects local links and points in a primary LSP configured to transmit packets by establishing a bypass LSP. Referring to FIG. 1, RT1-RT2-RT4-RT5 is the primary LSP, and RT2-RT3-RT4 is the bypass LSP. When the primary LSP fails, a point of local repair (PLR) switches the packets of the primary LSP to the bypass LSP for transmission.

After the path switching, the PLR needs to send messages carrying path refreshing information to an ingress point and a merge point (MP) in a time of holding a path refreshing state. Referring to FIG. 1, RT2 is the PLR, RT1 is the ingress point, and RT4 is the MP. After the path switching, the PLR needs to send a refreshing message corresponding to each LSP, and as a great number of LSPs are borne on the links of the primary LSP, the PLR needs to send a great number of refreshing messages. In a sending method in the prior art, a preset number of refreshing messages are sent each time. However, the inventor found that the sending method also has a problem that the PLR may fail to send all the messages in the time of holding the path refreshing state, so that the ingress point and the MP cannot establish an LSP in time.

SUMMARY OF THE INVENTION

Accordingly, the present invention is directed to a method, device, and system for establishing an LSP in FRR switching, which can ensure that an ingress point and an MP establishes an LSP in time.

In order to achieve the above objectives, the present invention provides the following technical solutions.

In one aspect, the present invention provides a method and a device for establishing an LSP in FRR switching.

A method for establishing an LSP in FRR switching in accordance with an embodiment of the present invention includes the following steps.

First messages are respectively sent to an ingress point and an MP on an LSP, where the first messages carry information of holding a path refreshing state, so that the ingress point and the MP determine the time of holding the path refreshing state according to the information of holding the path refreshing state in the first messages.

Second messages are respectively sent to the ingress point and the MP in the time of holding the path refreshing state, where the second messages carry information of refreshing a path state, so that the ingress point and the MP establish the LSP according to the information of refreshing the path state in the second messages.

A network equipment in accordance with an embodiment of the present invention includes a first message sending module and a second message sending module.

The first message sending module is configured to respectively send first messages to an ingress point and an MP on an LSP, where the first messages carry information of holding a path refreshing state, so that the ingress point and the MP determine the time of holding the path refreshing state according to the information of holding the path refreshing state in the first messages.

The second message sending module is configured to respectively send second messages to the ingress point and the MP in the time of holding the path refreshing state, where the second messages carry information of refreshing a path state, so that the ingress point and the MP establish the LSP according to the information of refreshing the path state in the second messages.

In another aspect, the present invention further provides another method and device for establishing an LSP in FRR switching.

A method for establishing an LSP in FRR switching in accordance with an embodiment of the present invention includes the following steps.

First messages sent by a PLR are received, where the first messages carry information of holding a path refreshing state.

A time of holding the path refreshing state is determined according to the information of holding the path refreshing state in the first messages.

Second messages sent by the PLR are received in the determined time of holding the path refreshing state, where the second messages carry information of refreshing a path state.

A local LSP is established according to the information of refreshing the path state in the second messages.

A network equipment in accordance with an embodiment of the present invention includes a first message receiving module, a second determination module, a second message receiving module, and a second establishment module.

The first message receiving module is configured to receive first messages sent by a PLR, where the first messages carry information of holding a path refreshing state.

The second determination module is configured to determine the time of holding the path refreshing state according to the information of holding the path refreshing state in the first messages received by the first message receiving module.

The second message receiving module is configured to receive second messages sent by the PLR in the time of holding the path refreshing state determined by the second determination module, where the second messages carry information of refreshing a path state.

The second establishment module is configured to establish a local LSP according to the information of refreshing the path state in the second messages received by the second message receiving module.

In addition, an embodiment of the present invention further provides a communication system, which includes a first network equipment and a second network equipment.

The first network equipment is configured to send first messages to the second network equipment on an LSP, where the first messages carry information of holding a path refreshing state, so that the second network equipment determines the time of holding the path refreshing state according to the information of holding the path refreshing state in the first messages; and send second messages to the second network equipment in the time of holding the path refreshing state, where the second messages carry information of refreshing a path state.

The second network equipment is configured to receive the first messages sent by the first network equipment determine the time of holding the path refreshing state according to the information of holding the path refreshing state in the first messages; receive the second messages sent by the first network equipment in the time of holding the path refreshing state; and establish a local LSP according to the information of refreshing the path state in the second messages.

In the method, device, and system for establishing an LSP in FRR switching in accordance with the above-mentioned embodiments of the present invention, the first messages carrying the information of holding the path refreshing state are sent to the ingress point and the MP, so that the ingress point and the MP determine the time of refreshing the path, so as to ensure sufficient time for receiving the second messages to refresh the local path information, thereby achieving the objective of correctly forwarding packets.

BRIEF DESCRIPTION OF THE DRAWINGS

To illustrate the technical solution according to the embodiments of the present invention or in the prior art more clearly, the accompanying drawings for describing the embodiments or the prior art are described briefly below. Apparently, the accompanying drawings in the following description are only some embodiments of the present invention, and persons of ordinary skill in the art can derive other drawings from the accompanying drawings without creative efforts.

FIG. 1 is a schematic view of a network topology of an MPLS network;

FIG. 2 is a flow chart of a method for establishing an LSP in FRR switching according to an embodiment of the present invention;

DETAILED DESCRIPTION OF ILLUSTRATIVE EMBODIMENTS

The following detailed description is directed to the technical solution of the present invention with reference to the accompanying drawings. However, the embodiments to be described are only part of, rather than all of, the embodiments of the present invention. All other embodiments, which can be derived by those skilled in the art from the embodiments given herein without any creative efforts, fall within the scope of the present invention.

The present invention is hereinafter described in detail with reference to embodiments and accompanying drawings.

Referring to FIG. 2, in an embodiment, the present invention provides a method for establishing an LSP in FRR switching, which is applicable to a PLR, and includes the following steps.

In step S201, first messages are respectively sent to an ingress point and an MP on an LSP, where the first messages carry information of holding a path refreshing state, so that the ingress point and the MP determine the time of holding the path refreshing state according to the information of holding the path refreshing state in the first messages.

In step S202, second messages are respectively sent to the ingress point and the MP in the time of holding the path refreshing state, where the second messages carry information of refreshing a path state, so that the ingress point and the MP establish the LSP according to the information of refreshing the path state in the second messages.

In the method for establishing an LSP in FRR switching according to the embodiment of the present invention, the first messages carrying the information of holding the path refreshing state are sent to the ingress point and the MP, so that the ingress point and the MP determine the time of refreshing the path, so as to ensure sufficient time for receiving the second messages to refresh the local path information, thereby achieving the objective of correctly forwarding packets.

Figure 3:
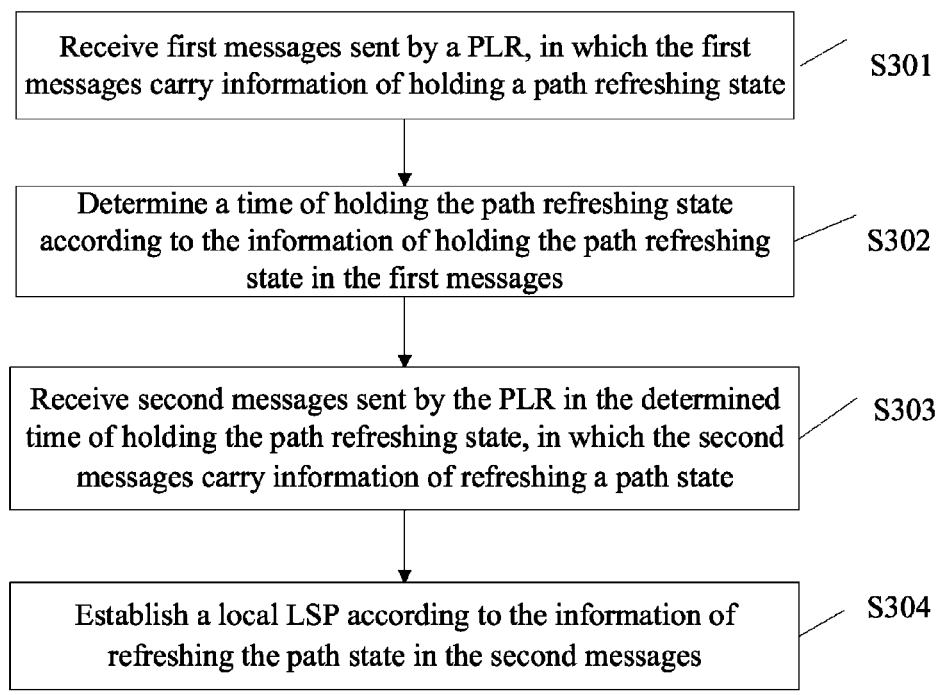
FIG. 3 is a flow chart of a method for establishing an LSP in FRR switching according to another embodiment of the present invention.

Referring to FIG. 3, in an embodiment, the present invention provides a method for establishing an LSP in FRR switching, which is applicable to an ingress point or an MP, and includes the following steps.

In step S301, first messages sent by a PLR are received, where the first messages carry information of holding a path refreshing state.

In step S302, a time of holding the path refreshing state is determined according to the information of holding the path refreshing state in the first messages.

In step S303, second messages sent by the PLR are received in the determined time of holding the path refreshing state, where the second messages carry information of refreshing a path state.

In step S304, a local LSP is established according to the information of refreshing the path state in the second messages.

In the method for establishing an LSP in FRR switching according to the embodiment of the present invention, the first messages carrying the information of holding the path refreshing state are received, and the time of holding the path refreshing state is determined, so as to ensure sufficient time for locally receiving the second messages carrying the information of refreshing the path state to refresh the local path information in time, thereby achieving the objective of correctly forwarding packets.

Figure 4:
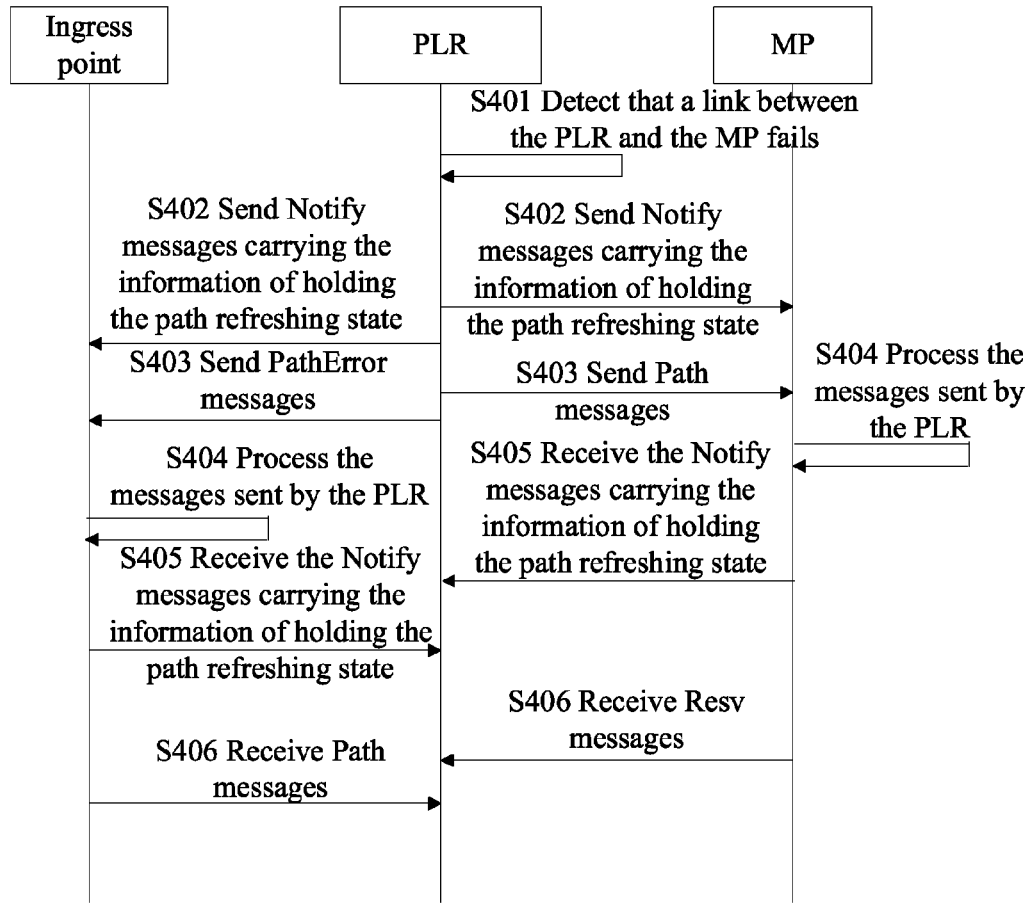
FIG. 4 is a flow chart of a method for establishing an LSP in FRR switching according to another embodiment of the present invention.

In order to enable persons skilled in the art to understand the technical solutions provided in the embodiments of the present invention more clearly, the method according to the embodiments of the present invention is further introduced, and a specific process is as shown in FIG. 4.

The embodiment of the present invention is described by taking a schematic view of a network topology as shown in FIG. 1 as an example.

In step S401, a PLR detects that a primary LSP fails and a path switching is performed.

In the embodiment of the present invention, a manner of detecting the failure by the PLR in the prior art is applicable to this step, so the details will not be described herein again.

In step S402, the PLR sends first messages to an ingress point and an MP, where the first messages carry information of holding a path refreshing state.

In the embodiment of the present invention, the first messages are Notify messages, where the Notify messages may be sent to an upstream point, or a downstream point. A structure of the Notify message is described in the following.

```
<Notify message>          ::= <Common Header> [<INTEGRITY>]
    [ [<MESSAGE_ID_ACK> | MESSAGE_ID_NACK>] ... ]
    [ <MESSAGE_ID> ]
    <ERROR_SPEC> <notify session list>
  <notify session list>      ::= [ <notify session list> ]
    <upstream notify session> | <downstream notify session>
<upstream notify session> ::= <SESSION> [ <ADMIN _STATUS> ]
        [<POLICY_DATA>...]
        <sender descriptor>
  <downstream notify session> ::= <SESSION> [<POLICY_DATA>...]
        <flow descriptor list>
```

The PLR selects an Error Spec (error cause) object from the structure of the Notify message, adds the information configured to instruct the ingress point and the MP to hold the path refreshing state to the Error Spec object, where the Error Spec object is formed by an Error Code field and an Error Value field. For example, by taking the addition of the failure cause to the Error Spec as an example for illustration, a corresponding code is added to the Error Code field to indicate that the path switching is performed, and a corresponding value is added to the Error Value field to indicate a cause of the path switching, for example, that a transmission medium (optical fiber) of a link is disconnected.

When corresponding information is added to the Error Spec, corresponding values need to be configured for the fields in the Error Spec object. For the configuration of the Error Code field, an unused value is selected from a range of values of the Error Code to indicate that the PLR performs the path switching. For the configuration of the Error Value field, triggering conditions of performing the path switching, that is, causes of the path switching, are statistically analyzed, and a corresponding number is configured for each triggering condition.

In the embodiment of the present invention, existing messages are used for notifying the related points that the path switching is performed; however, the present invention is not limited thereto, and a new message may also be added to carry the information of holding the path refreshing state, and then sent to the related points.

In step S403, the PLR respectively sends second messages to the ingress point and the MP, where the second messages carry information of refreshing a path state.

The second messages sent to the ingress point carry LSP error information, and the second messages sent to the MP carry LSP establishment information.

In the embodiment of the present invention, the second messages are divided into at least two message groups according to a pre-acquired number of messages sent each time. For example, the PLR acquires an average number of messages sent in unit time from local records configured to record a history of messages sent. The acquired average number of messages sent is configured as the number of messages sent each time, and the second messages are divided into groups according to the number of messages sent each time. After the second messages are divided, the divided message groups are sent to the ingress point and the MP according to a pre-acquired sending interval. The sending interval may be determined by a processing time assigned by a central processing unit (CPU) to the task. If the processing time is short, the sending interval is correspondingly short. According to the acquired sending interval, the PLR sends the PathError messages to the Ingress point, where each PathError message carries primary LSP error information configured to indicate an LSP in which an error occurs and instruct the Ingress point to re-establish the LSP in the PathError message; the PLR sends Path messages to the MP in batches, where each Path message carries bypass LSP establishment information, so that the traffic of the PLR can be sent to the MP through a bypass LSP.

It should be noted that, in order to ensure that the technical solution of the embodiment of the present invention satisfies protocol specifications so as to facilitate further extension, the PLR according to the embodiment of the present invention sends the PathError messages to the Ingress point. However, if points on the link between the PLR and the Ingress point can identify the Notify messages carrying the information of holding the path refreshing state, it indicates that the Ingress point can trigger the re-establishment of all the primary LSPs immediately after receiving the Notify messages, so that the PLR does not need to send the PathError messages to the Ingress point in batches, thereby reducing the processing load of the Ingress point.

In step S404, the ingress point and the MP process the messages sent by the PLR.

In the embodiment of the present invention, if the Ingress point can determine that the path switching is performed according to the Notify messages, that is, the Error Spec objects in the Notify messages, the Ingress point determines that the path switching is performed according to the values carried in the Error Code field and the Error Value field. After determining that the path switching is performed, the Ingress point notifies an LSP management module of re-establishing the LSP, and instructs the LSP management module to generate Path messages for re-establishing the primary LSP according to the locally stored primary LSP information. However, if the Ingress point cannot determine whether the path switching is performed according to the Notify messages, the Ingress point determines the time of holding the path refreshing state. For example, after receiving the Notify messages, the Ingress point prolongs the current holding time, and determines the prolonged holding time as a target holding time. In the determined target holding time, the Ingress point receives PathError messages, and notifies the LSP management module of generating Path messages for re-establishment according to each PathError message.

The processing of the Ingress point is introduced above, and the processing of the MP is introduced below. After receiving the Notify messages, the MP acquires path failure information from the Notify messages, and prolongs the time of holding the path refreshing state according to the path failure information. In the prolonged holding time, the MP receives Path messages sent by the PLR, and updates upstream path information of the MP according to LSP information carried in the Path messages; and at the same time, generates a Resv message as a response message for each Path message.

In step S405, the PLR receives third messages carrying the information of holding the path refreshing state.

In the embodiment of the present invention, the PLR receives the third messages carrying the information of holding the path refreshing state from the Ingress point and the MP, where the method for sending the third messages by the ingress point and the MP is the same as step S402, so the details will not be described herein again.

In step S406, the PLR processes fourth messages carrying the information of refreshing the path state.

In the embodiment of the present invention, the PLR receives Path messages sent by the Ingress point, and updates local upstream path information according to LSP information carried in the Path messages, where the specific implementation method is the same as the processing method of the MP in step S404, so the details will not be described herein again. For Resv messages sent by the MP, the PLR updates downstream path information according to LSP information in the Resv messages.

Figure 5:
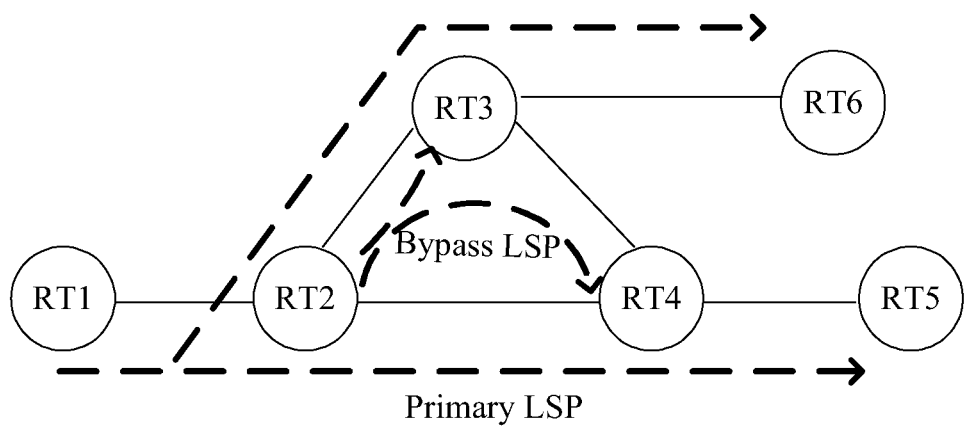
FIG. 5 is a schematic view of another network topology of the MPLS network.

The embodiments of the present invention are described by taking the processing process using point-to-point transmission as an example; however, the prevent invention is not limited thereto, and other transmission methods such as point-to-multipoint transmission may also be used. As shown in FIG. 5, RT1-RT2-RT4-RT5 and RT2-RT3-RT6 are primary LSPs, and RT2-RT3-RT4 is a bypass LSP. When a link between RT2 and RT4 fails, the method for refreshing the path state by RT2, RT1, and RT4 is similar to the above process, so the details will not be described herein again.

In the method for establishing an LSP in FRR switching according to the embodiment of the present invention, the first messages carrying the information of holding the path refreshing state are sent to the ingress point and the MP, so that the ingress point and the MP determine the time of refreshing the path, so as to ensure sufficient time for receiving the second messages to refresh the local path information, thereby achieving the objective of correctly forwarding packets. The second messages are sent to the ingress point and the MP in batches, so as to reduce the processing load of the ingress point and the MP, ensure the normal operation of the ingress point and the MP, reasonably use network resources, and reduce the transmission load of the network. The information of holding the path refreshing state is carried in an Error Spec field of a Notify message, so that the holding time of the ingress point and the MP is prolonged by using a field of an existing packet without adding any other new message, and the implementation is simple and convenient.

Figure 6:
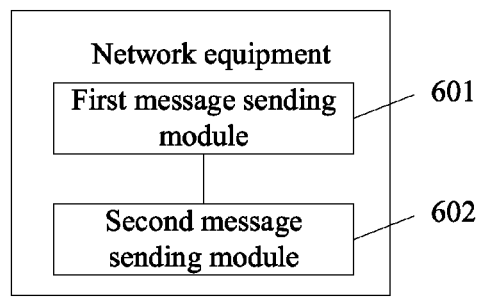
FIG. 6 is a schematic structural view of a network equipment according to an embodiment of the present invention.

Referring to FIG. 6, an embodiment of the present invention provides a network equipment, which includes a first message sending module 601 and a second message sending module 602.

The first message sending module 601 is configured to respectively send first messages to an ingress point and an MP on an LSP, where the first messages carry information of holding a path refreshing state, so that the ingress point and the MP determine a time of holding the path refreshing state according to the information of holding the path refreshing state in the first messages.

The second message sending module 602 is configured to respectively send second messages to the ingress point and the MP in the time of holding the path refreshing state, where the second messages carry information of refreshing a path state, so that the ingress point and the MP establish the LSP according to the information of refreshing the path state in the second messages.

Figure 7:
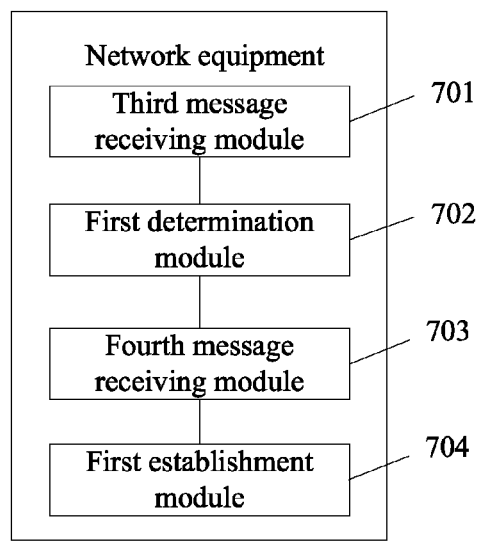
FIG. 7 is another schematic structural view of the network equipment in FIG. 6.

Referring to FIG. 7, the network equipment further includes a third message receiving module 701, a first determination module 702, a fourth message receiving module 703, and a first establishment module 704.

The third message receiving module 701 is configured to receive third messages, where the third messages carry the information of holding the path refreshing state.

The first determination module 702 is configured to determine the time of holding the path refreshing state according to the information of holding the path refreshing state in the third messages received by the third message receiving module.

The fourth message receiving module 703 is configured to receive fourth messages in the time of holding the path refreshing state determined by the first determination module, where the fourth messages carry the information of refreshing the path state.

The first establishment module 704 is configured to establish the local LSP according to the information of refreshing the path state in the fourth messages received by the fourth message receiving module 703.

In the embodiment of the present invention, the network equipment may be a router, a Layer 3 switch, or other equipment having a routing function.

The network equipment according to the embodiment of the present invention may be used in combination with the method according to the embodiments of the present invention. The first messages carrying the information of holding the path refreshing state are sent to the ingress point and the MP, so that the ingress point and the MP determine the time of refreshing the path, so as to ensure sufficient time for receiving the second messages to refresh the local path information, thereby achieving the objective of correctly forwarding packets. The second messages are sent to the ingress point and the MP in batches, so as to reduce the processing load of the ingress point and the MP, ensure the normal operation of the ingress point and the MP, reasonably use network resources, and reduce the transmission load of the network. The information of holding the path refreshing state is carried in an Error Spec field of a Notify message, so that the holding time of the ingress point and the MP is prolonged by using a field of an existing packet without adding any other new message, and the implementation is simple and convenient.

Figure 8:
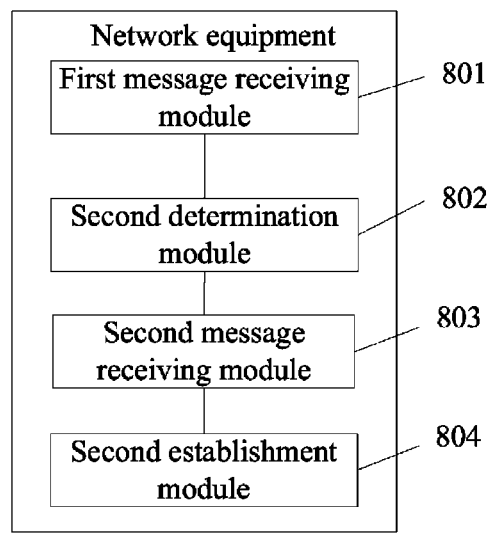
FIG. 8 is a schematic structural view of another network equipment according to an embodiment of the present invention.

Referring to FIG. 8, an embodiment of the present invention provides another network equipment, which includes a first message receiving module 801, a second determination module 802, a second message receiving module 803, and a second establishment module 804.

The first message receiving module 801 is configured to receive first messages sent by a PLR, where the first messages carry information of holding a path refreshing state.

The second determination module 802 is configured to determine a time of holding the path refreshing state according to the information of holding the path refreshing state in the first messages received by the first message receiving module.

The second message receiving module 803 is configured to receive second messages sent by the PLR in the time of holding the path refreshing state determined by the second determination module 802, where the second messages carry information of refreshing a path state.

The second establishment module 804 is configured to establish a local LSP according to the information of refreshing the path state in the second messages received by the second message receiving module 803.

Figure 9:
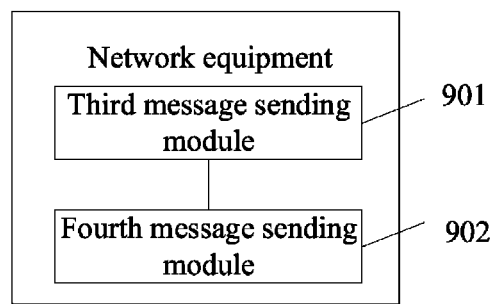
FIG. 9 is another schematic structural view of the network equipment in FIG. 8.

Optionally, referring to FIG. 9, the network equipment further includes a third message sending module 901 and a fourth message sending module 902.

The third message sending module 901 is configured to send third messages to the PLR, where the third messages carry the information of holding the path refreshing state.

The fourth message sending module 902 is configured to send fourth messages to the PLR, where the fourth messages carry the information of refreshing the path state.

In the embodiment of the present invention, the network equipment may be a router, a Layer 3 switch, or other equipment having a routing function.

The network equipment according to the embodiment of the present invention may be used in combination with the method according to the embodiments of the present invention. The first messages carrying the information of holding the path refreshing state are received, and the time of holding the path refreshing state is determined, so as to ensure sufficient time for locally receiving the second messages carrying the information of refreshing the path state to refresh the local path information in time, thereby achieving the objective of correctly forwarding packets. The second messages are received in batches, so as to reduce the local processing load, ensure the normal operation of the ingress point and the MP, reasonably use network resources, and reduce the transmission load of the network. The information of holding the path refreshing state is carried in an Error Spec field of a Notify message, so that the holding time of the ingress point and the MP is prolonged by using a field of an existing packet without adding any other new message, and the implementation is simple and convenient.

Figure 10:
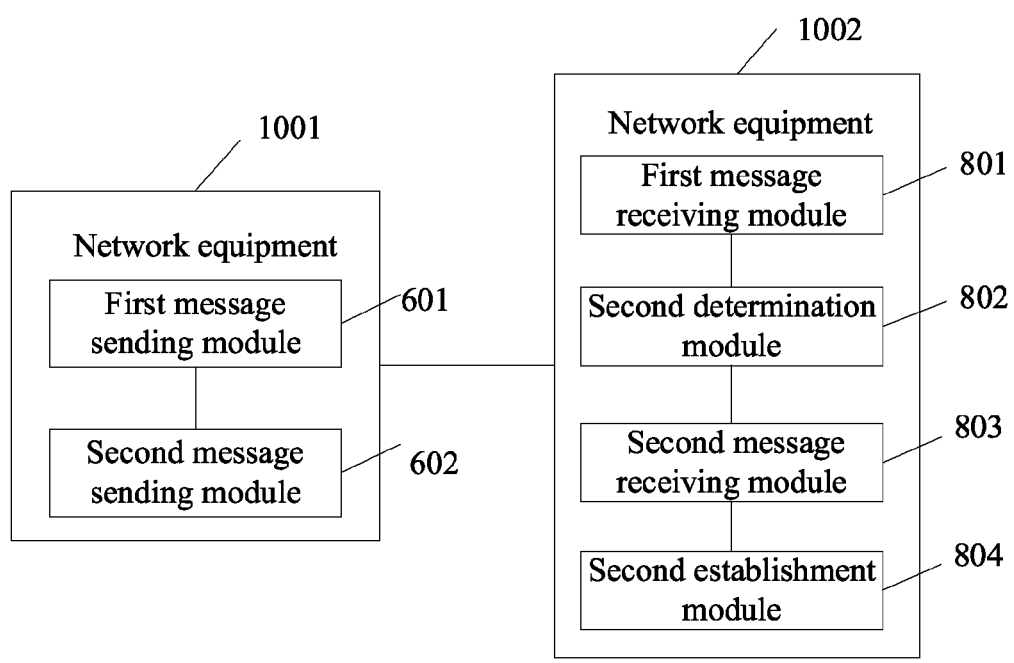
FIG. 10 is a schematic structural view of a communication system according to an embodiment of the present invention.

In addition, referring to FIG. 10, an embodiment of the present invention provides a communication system, which includes a first network equipment 1001 and a second network equipment 1002.

The first network equipment 1001 is configured to send first messages to the second network equipment on an LSP, where the first messages carry information of holding a path refreshing state, so that the second network equipment determines a time of holding the path refreshing state according to the information of holding the path refreshing state in the first messages; and send second messages to the second network equipment in the time of holding the path refreshing state, where the second messages carry information of refreshing a path state.

The second network equipment 1002 is configured to receive the first messages sent by the first network equipment, where the first messages carry the information of holding the path refreshing state; determine the time of holding the path refreshing state according to the information of holding the path refreshing state in the first messages; receive the second messages sent by the first network equipment in the time of holding the path refreshing state, where the second messages carry the information of refreshing the path state; and establish a local LSP according to the information of refreshing the path state in the second messages.

The communication system according to the embodiment of the present invention may be used in combination with the method and device according to the embodiments of the present invention. The first messages carrying the information of holding the path refreshing state are sent to the ingress point and the MP, so that the ingress point and the MP determine the time of refreshing the path, so as to ensure sufficient time for receiving the second messages to refresh the local path information, thereby achieving the objective of correctly forwarding packets. The second messages are sent to the ingress point and the MP in batches, so as to reduce the processing load of the ingress point and the MP, ensure the normal operation of the ingress point and the MP, reasonably use network resources, and reduce the transmission load of the network. The information of holding the path refreshing state is carried in an Error Spec field of a Notify message, so that the holding time of the ingress point and the MP is prolonged by using a field of an existing packet without adding any other new message, and the implementation is simple and convenient.

Persons of ordinary skill in the art should understand that all or a part of the steps of the method according to the embodiments of the present invention may be implemented by a program instructing relevant hardware. The program may be stored in a computer readable storage medium. When the program is run, one or a combination of the steps of the method according to the embodiments of the present invention are performed.

In addition, the functional units in the embodiments of the present invention may be integrated in one processing module or may each be an independent physical entity, or two or more units are integrated in one module. The integrated module may be accomplished through hardware or a software functional module. If the integrated module is accomplished through the software functional module and is sold or used as a separate product, the integrated module may be stored in a computer readable storage medium.

The storage medium may be a Read-Only Memory (ROM), a magnetic disk or a Compact Disk Read-Only Memory (CD-ROM).

The above descriptions are merely some exemplary embodiments of the present invention, but not intended to limit the scope of the present invention. Any modification, equivalent replacement, or improvement that can be easily thought of by persons skilled in the art should fall within the scope of the present invention. Therefore, the protection scope of the present invention is subject to the appended claims.

What is claimed is:

1. A method for establishing a label switching path (LSP) in fast rerouting (FRR) switching, the method comprising:
respectively sending, by a point of local repair (PLR), first messages to an ingress point and a merge point (MP) on an LSP, wherein the first messages carry information which is used to make the ingress point and the MP to determine a time of holding a path refreshing state and hold the path refreshing state according to the determined time; and
respectively sending, by the PLR, second messages to the ingress point and the MP in the time of holding the path refreshing state, wherein the second messages carry information related to refreshing a path state, so that the ingress point and the MP establish the LSP according to the information related to refreshing the path state in the second messages.

2. The method according to claim 1, wherein the first messages are Notify messages and the information carried in the first messages is stored in Error Spec objects of the Notify messages.

3. The method according to claim 1, wherein respectively sending the second messages to the ingress point and the MP in the time of holding the path refreshing state comprises:
dividing the second messages into at least two message groups according to a pre-acquired number of messages sent each time; and
respectively sending the at least two message groups to the ingress point and the MP according to a pre-acquired sending interval.

4. The method according to claim 1, wherein after the respectively sending the second messages to the ingress point and the MP in the time of holding the path refreshing state, the method further comprises:

receiving third messages, wherein the third messages carry the information related to holding the path refreshing state;

determining the time of holding the path refreshing state according to the information related to holding the path refreshing state in the third messages;

receiving fourth messages in the determined time of holding the path refreshing state, wherein the fourth messages carry the information related to refreshing the path state; and establishing a local LSP according to the information related to refreshing the path state in the fourth messages.

5. A method for establishing a label switching path (LSP) in fast rerouting (FRR) switching, the method comprising:

receiving a first message sent by a point of local repair (PLR), wherein the first message carries information which is used to determine a time of holding a path refreshing state and hold the path refreshing state according to the determined time;

determining the time of holding the path refreshing state according to the information carried in the first message;

receiving a second message sent by the PLR in the determined time, wherein the second message carries information related to refreshing a path state; and establishing a local LSP according to the information related to refreshing the path state in the second message.

6. The method according to claim 5, wherein after the receiving the second message, the method further comprises:

sending a third message to the PLR, wherein the third message carries the information related to holding the path refreshing state; and sending a fourth message to the PLR, wherein the fourth message carries the information related to refreshing the path state.

7. A network equipment, comprising:

a first message sending module, configured to respectively send first messages to an ingress point and a merge point (MP) on a label switching path (LSP), wherein the first messages carry information which is used to make the ingress point and the MP to determine a time of holding a path refreshing state and hold the path refreshing state according to the determined time; and a second message sending module, configured to respectively send second messages to the ingress point and the MP in the time of holding the path refreshing state, wherein the second messages carry information related to refreshing a path state, so that the ingress point and the MP establish the LSP according to the information related to refreshing the path state in the second messages.

8. The network equipment according to claim 7, further comprising:

a first message receiving module configured to receive third messages, wherein the third messages carry the information related to holding the path refreshing state;

a first determination module configured to determine the time of holding the path refreshing state according to the information related to holding the path refreshing state in the third messages received by the third message receiving module;

a second message receiving module configured to receive fourth messages in the time of holding the path refreshing state determined by the first determination module, wherein the fourth messages carry the information related to refreshing the path state; and a first establishment module configured to establish a local LSP according to the information related to refreshing the path state in the fourth messages received by the fourth message receiving module.

9. A network equipment, comprising:

a first message receiving module, configured to receive a first message sent by a point of local repair (PLR), wherein the first message carries information which is used to determine a time of holding a path refreshing state and hold the path refreshing state according to the determined time;

a second determination module, configured to determine a time of holding the path refreshing state according to the information carried in the first message received by the first message receiving module;

a second message receiving module, configured to receive a second message sent by the PLR in the time of holding the path refreshing state determined by the second determination module, wherein the second message carries information related to refreshing a path state; and a second establishment module, configured to establish a local label switching path (LSP) according to the information related to refreshing the path state in the second message received by the second message receiving module.

10. The network equipment according to claim 9, further comprising:

a third message sending module, configured to send a third message to the PLR after the second message receiving module have received the second message sent by the PLR, wherein the third message carries the information related to holding the path refreshing state; and a fourth message sending module, configured to send a fourth message to the PLR after the third message sending module have sent the third message to the PLR, wherein the fourth message carries the information related to refreshing the path state.

11. A communication system, comprising:

a first network equipment, configured to send a first message to a second network equipment on a label switching path (LSP), wherein the first message carries information which is used to make the second network equipment to determine a time of holding a path refreshing state and hold the path refreshing state according to the determined time; and send a second message to the second network equipment in the time of holding the path refreshing state, wherein the second message carries information related to refreshing a path state, so that the second network equipment establishes the LSP according to the information related to refreshing the path state in the second message; and the second network equipment, configured to receive the first message sent by the first network equipment; determine the time of holding the path refreshing state according to the information in the first message; receive the second message sent by the first network equipment in the time of holding the path refreshing state; and establish a local LSP according to the information related to refreshing the path state in the second message.

* * * * *